US012726820B2

(12) United States Patent
Reeves et al.

(10) Patent No.: US 12,726,820 B2
(45) Date of Patent: Sep. 1, 2026

(54) APPARATUSES, SYSTEM, AND METHOD OF OPERATING A WIRELESS NETWORK

(71) Applicant: BRITISH TELECOMMUNICATIONS PUBLIC LIMITED COMPANY, London (GB)

(72) Inventors: Andrew Reeves, London (GB); MohammadHossein Zoualfaghari, London (GB); Ian Neild, London (GB)

(73) Assignee: BRITISH TELECOMMUNICATIONS PUBLIC LIMTED COMPANY, London (GB)

( * ) Notice: Subject to any disclaimer, the term of this patent is extended or adjusted under 35 U.S.C. 154(b) by 187 days.

(21) Appl. No.: 18/568,182

(22) PCT Filed: May 10, 2022

(86) PCT No.: PCT/EP2022/062584
§ 371 (c)(1),
(2) Date: Dec. 7, 2023

(87) PCT Pub. No.: WO2022/263060
PCT Pub. Date: Dec. 22, 2022

(65) Prior Publication Data
US 2024/0276219 A1 Aug. 15, 2024

(30) Foreign Application Priority Data
Jun. 18, 2021 (GB) ...................................... 2108742

(51) Int. Cl.
*H04W 12/08* (2021.01)
*H04W 12/03* (2021.01)
*H04W 84/12* (2009.01)

(52) U.S. Cl.
CPC .......... *H04W 12/08* (2013.01); *H04W 12/03* (2021.01); *H04W 84/12* (2013.01)

(58) Field of Classification Search
CPC ..... H04W 12/08; H04W 12/03; H04W 84/12; H04W 12/06
See application file for complete search history.

(56) References Cited

U.S. PATENT DOCUMENTS 7,277,547 B1 10/2007 Delker et al.
8,315,615 B2 11/2012 Kalhan et al.
(Continued)

FOREIGN PATENT DOCUMENTS

CN 104093164 A 10/2014
CN 204168311 U 2/2015
(Continued)

OTHER PUBLICATIONS

International Preliminary Report on Patentability dated May 23, 2024, issued for International Application No. PCT/EP2022/078200 (12 pages).
(Continued)

*Primary Examiner* — John J Lee
(74) *Attorney, Agent, or Firm* — Nixon & Vanderhye P.C.

(57) ABSTRACT

A telecommunications network comprises: User Equipment (UE); a Wireless Access Point (WAP), identifiable by a network device identifier; a source Wireless Local Area Network (WLAN), provided by means of the WAP and identifiable by means of a source network identifier; and a target WLAN. A method of operating the network comprises: generating a cryptographic output by performing a cryptographic function upon both the source network identifier and the network device identifier; assigning, to the target WLAN, access credentials, wherein said access credentials comprise the cryptographic output; and by means of the UE: identifying the source network identifier and the network device identifier; cryptographically processing the identified source network identifier and the identified network device identifier so as to derive the cryptographic
(Continued)

Figure 1:
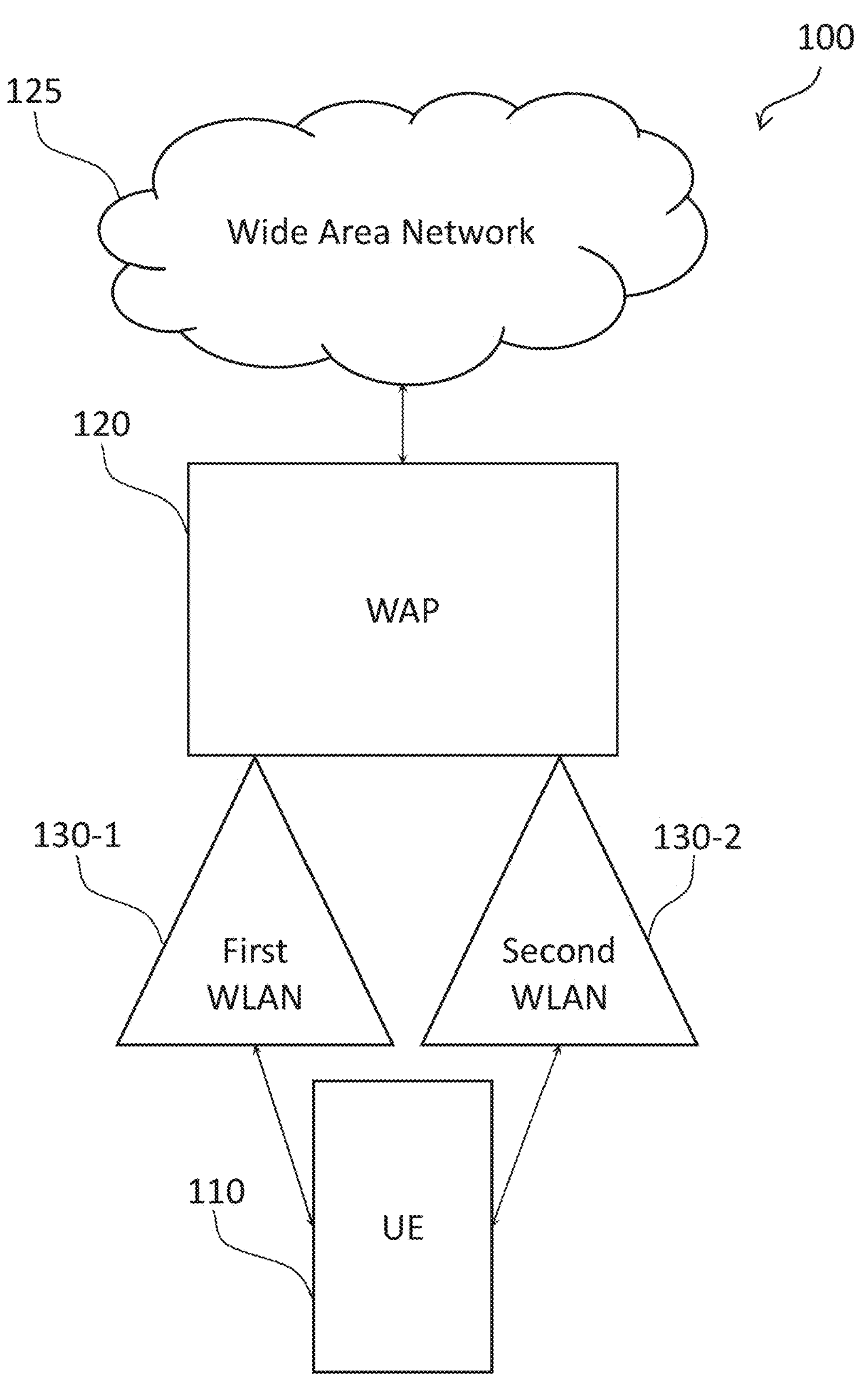

output; and requesting a connection to, or via, the target WLAN using access credentials derived by the UE from said cryptographic output.

22 Claims, 2 Drawing Sheets

(56) References Cited

U.S. PATENT DOCUMENTS

| | | | | |
|---|---|---|---|---|
| 8,737,363 | B2 | 5/2014 | Ozluturk et al. | |
| 9,949,120 | B2 | 4/2018 | Liu et al. | |
| 10,292,027 | B2 | 5/2019 | Goluboff | |
| 10,298,581 | B2 | 5/2019 | Shah et al. | |
| 10,334,438 | B2 | 6/2019 | Iyer et al. | |
| 10,635,133 | B2 | 4/2020 | Begley | |
| 2004/0253969 | A1 | 12/2004 | Nguyen | |
| 2005/0286456 | A1 | 12/2005 | McNew et al. | |
| 2008/0198823 | A1* | 8/2008 | Shiu | H04W 12/04 370/338 |
| 2008/0220741 | A1 | 9/2008 | Hung | |
| 2010/0309815 | A1 | 12/2010 | Yepez | |
| 2013/0103807 | A1 | 4/2013 | Couto | |
| 2015/0050906 | A1 | 2/2015 | Yuasa | |
| 2016/0077805 | A1* | 3/2016 | Boenisch | G06F 7/588 708/251 |
| 2016/0087811 | A1 | 3/2016 | Yin et al. | |
| 2016/0249287 | A1 | 8/2016 | Xie et al. | |
| 2017/0019390 | A1 | 1/2017 | Gu | |
| 2017/0055315 | A1 | 2/2017 | Lin | |
| 2017/0245234 | A1 | 8/2017 | Bradish | |
| 2017/0347359 | A1 | 11/2017 | Yang et al. | |
| 2018/0176771 | A1 | 6/2018 | Yang et al. | |
| 2018/0376448 | A1 | 12/2018 | Wild et al. | |
| 2020/0037134 | A1 | 1/2020 | Wheeler | |
| 2020/0100107 | A1* | 3/2020 | Hsiao | H04L 9/3242 |
| 2020/0275466 | A1 | 8/2020 | Hodroj | |
| 2021/0315010 | A1 | 10/2021 | Hsu et al. | |
| 2021/0400443 | A1 | 12/2021 | Wheeler | |

FOREIGN PATENT DOCUMENTS

| | | | |
|---|---|---|---|
| CN | 104796888 | A | 7/2015 |
| CN | 104869612 | A | 8/2015 |
| CN | 104981000 | A | 10/2015 |
| CN | 105764050 | A | 7/2016 |
| CN | 105792315 | A | 7/2016 |
| CN | 106304409 | A | 1/2017 |
| CN | 106572465 | A | 4/2017 |
| CN | 106847264 | A | 6/2017 |
| CN | 107529205 | A | 12/2017 |
| CN | 104981000 | B | 6/2018 |
| CN | 108391238 | A | 8/2018 |
| CN | 108834137 | A | 11/2018 |
| CN | 109547266 | A | 3/2019 |
| CN | 110366229 | A | 10/2019 |
| CN | 110460995 | A | 11/2019 |
| CN | 106304409 | B | 12/2019 |
| CN | 110730043 | A | 1/2020 |
| CN | 112738867 | A | 4/2021 |
| CN | 110557305 | B | 10/2021 |
| DE | 102021134386 | A1 | 9/2022 |
| EP | 1576444 | A1 | 9/2005 |
| EP | 1871072 | A1 | 12/2007 |
| EP | 1871072 | B1 | 6/2015 |
| EP | 3122144 | A1 | 1/2017 |
| EP | 3576444 | A1 | 12/2019 |
| EP | 3664491 | B1 | 6/2022 |
| GB | 2552016 | A | 1/2018 |
| GB | 2607948 | A | 12/2022 |
| JP | 2013222993 | A | 10/2013 |
| JP | 2015104017 | A | 6/2015 |
| JP | 2017194891 | A | 10/2017 |
| KR | 20100048986 | A | 5/2010 |
| KR | 101964983 | B1 | 4/2019 |
| KR | 101980039 | B1 | 5/2019 |
| WO | 2004059450 | A1 | 7/2004 |
| WO | 2009016368 | A2 | 2/2009 |
| WO | 2015063146 | A1 | 5/2015 |
| WO | 2016180062 | A1 | 11/2016 |
| WO | 2018227715 | A1 | 12/2018 |
| WO | 2019048857 | A1 | 3/2019 |
| WO | 2019233311 | A1 | 12/2019 |
| WO | 2020066627 | A1 | 4/2020 |
| WO | 2022067274 | A1 | 3/2022 |

OTHER PUBLICATIONS

Patents Act 1977: Examination Report under Section 18(3) dated Sep. 17, 2025, issued for GB2108742.4 (4 pages).

Communication pursuant to Article 94(3) EPC dated Oct. 31, 2025, issued for European Application No. 22 711 898.1 (7 pages).

Combined Search and Examination Report under Sections 17 and 18(3) dated Oct. 31, 2022 issued for GB application No. GB2207757.2 (5 pages).

Combined Search and Examination Report under Sections 17 and 18(3) dated Dec. 2, 2021 issued for GB application No. GB2108742.4 (7 pages).

Combined Search and Examination Report under Sections 17 and 18(3) dated Apr. 19, 2022 issued for GB application No. GB2116053.6 (7 pages).

Combined Search and Examination Report under Sections 17 and 18(3) dated Jul. 20, 2022 issued for GB application No. GB2201522.6 (5 pages).

Combined Search and Examination Report under Sections 17 and 18(3) dated Feb. 20, 2023 issued for GB application No. GB2301541.5 (4 pages).

Patents Act 1977: Report of Teams conversation between Patent Attorney Svilen Mirtchev and Patent Examiner Daniel Voisey held Sep. 28, 2022 dated Sep. 30, 2022 for GB Application No. GB2201522.6 (2 pages).

Combined Search and Examination Report under Sections 17 and 18(3) dated Jul. 6, 2021 issued for GB application No. GB2104045.6 (5 pages).

International Search Report and Written Opinion of the International Searching Authority dated Jul. 7, 2023 issued for International Application No. PCT/EP2023/059799 (13 pages).

International Preliminary Report on Patentability dated Oct. 5, 2023 issued for International Application No. PCT/EP2022/054265 (10 pages).

International Search Report and Written Opinion of the International Searching Authority dated Sep. 8, 2022 issued for International Application No. PCT/EP2022/062584 (10 pages).

International Search Report and Written Opinion of the International Searching Authority dated Apr. 11, 2023 issued for International Application No. PCT/EP2023/050572 (17 pages).

Extended European Search Report dated Nov. 21, 2022 issued for European Application No. 22175623.2 (8 pages).

International Search Report and Written Opinion of the International Searching Authority dated Jul. 11, 2022 issued for International Application No. PCT/EP2022/054265 (16 pages).

International Search Report and Written Opinion of the International Searching Authority dated Feb. 7, 2023 issued for International Application No. PCT/EP2022/078200 (17 pages).

International Preliminary Report on Patentability dated Dec. 5, 2024, issued for International Application No. PCT/EP2023/059799 (8 pages).

Communication pursuant to Article 94(3) EPC dated Feb. 4, 2025 issued for European Application No. 22 711 898.1-1218 (8 pages).

Wikipedia Service set (802.11 network) retrieved from https://en.wikipedia.org/w/index/php?title=Service_set_(802.11_network)&oldid=1270161143, no later than Jun. 13, 2025 (5 pages).

Patents Act 1977: Intention to Grant under Section 18(4) dated Apr. 17, 2025 issued for GB2207757.2 (2 pages).

Intention to Grant under Section 18(4) dated Sep. 24, 2024, issued for GB Application No. GB2116053.6 (2 pages).

Examination Report under Section 18(3) dated Sep. 12, 2024, issued for GB Application No. GB2116053.6 (3 pages).

(56) References Cited

OTHER PUBLICATIONS

International Preliminary Report on Patentability dated Aug. 22, 2024, issued for International Application No. PCT/EP2023/050572 (11 pages).
Office Action dated Apr. 16, 2026, issued for Chinese Application No. CN202280042609.8 (8 pages) and translation (8 pages).
Patents Act 1977: Examination Report under Section 18(3) dated Nov. 24, 2025, issued for GB2108742.4 (3 pages).
Office Action dated Apr. 16, 2026, issued for Chinese Application No. 202280042609.8 (12 pages).
Communication under Rule 71(3) EPC dated May 15, 2026, issued for European Application No. 22 711 898.1 (8 pages).

* cited by examiner

APPARATUSES, SYSTEM, AND METHOD OF OPERATING A WIRELESS NETWORK

CROSS-REFERENCE TO RELATED APPLICATIONS

This application is the U.S. national phase of International Application No. PCT/EP2022/062584 filed May 10, 2022, which designated the U.S. and claims priority to GB 2108742.4 filed Jun. 18, 2021, the entire contents of each of which are hereby incorporated by reference.

FIELD OF INVENTION

The present invention relates to a method of operating a telecommunications network, and in particular a Wireless Local Area Network (WLAN), as well as to a system and components therefor.

BACKGROUND

Wireless Access Points (WAPs) may facilitate data connectivity between a wide area network (e.g. a fixed-access broadband network) and wireless communication devices (herein also referred to as “User Equipment”, UE).

WAPs provide Wireless Local Area Networks (WLANs) that work over a radio frequency spectrum with low transmit power, typically providing a range of several meters. For example, a WLAN is available to use any one of the IEEE® 802.11 family of standards (commonly known as Wi-Fi®). A UE is available to connect to WLANs provided by the WAP.

In order for a UE to connect to a WLAN, the UE must first identify the WAP providing the WLAN, as well as identify the WLAN. Having identified the WLAN and the WAP, a UE may, typically (and as generally recommended), first need to be authenticated so as to connect to the WLAN; this is usually performed by a user providing to the WAP access credentials (e.g. a password) associated with the WLAN.

With ever-increasing numbers of WAPs, WLANs and UEs, managing secure access to WLANs may be a burdensome task for users of UEs, requiring manual identification of WLANs and input of access credentials.

To help reduce this burden, there have been proposed methods for automatically deriving access credentials for a WLAN and then connecting to that WLAN using such derived access credentials; this may be referred to as a “zero touch connection” process, since user input is not required for a UE to connect to a new WLAN.

In order to facilitate zero touch connection, access credentials may be encoded within a broadcast network identifier for a WLAN, such as a Service Set IDentification (SSID), and a UE may decode the network identifier so as to derive the access credentials. The UE then attempts to connect to a WLAN with which the access credentials are associated.

However, the functionality of existing zero-touch connection systems may be limited, typically being configured only for setting-up few Internet of Things (IoT) devices with little dynamic control as to which WLANs the devices connect.

Furthermore, ever-more sophisticated methods are being developed to compromise secure operation of WLANs, and zero-touch connection systems may be particularly vulnerable to compromise given that they are contingent on communicating secret access credentials.

It is an aim of the present invention to at least alleviate some of the aforementioned problems.

STATEMENTS OF INVENTION

According to a first aspect of the present invention, there is provided: a method of operating a telecommunications network, the telecommunications network comprising: User Equipment (UE); a Wireless Access Point (WAP), identifiable by means of a network device identifier; a source Wireless Local Area Network (WLAN), provided by means of the WAP and identifiable by means of a source network identifier; and a target WLAN; and the method comprising the steps of: generating a cryptographic output by performing a cryptographic function upon both the source network identifier and the network device identifier; assigning, to the target WLAN, access credentials, wherein said access credentials comprise the cryptographic output; and by means of the UE: identifying the source network identifier and the network device identifier; cryptographically processing the identified source network identifier and the identified network device identifier so as to derive the cryptographic output; and requesting a connection to, or via, the target WLAN using access credentials derived by the UE from said cryptographic output.

Preferably, the step of cryptographically processing the identified source network identifier and the identified network device identifier is performed in response to the UE identifying a pre-defined string in the source network identifier and the network device identifier.

Preferably, cryptographically processing the retrieved source network identifier and the retrieved network device identifier is performed upon only a portion of the source network identifier and/or the network device identifier, said portion being identifiable to UE by means of a/the pre-defined string in the source network identifier and/or the network device identifier.

Optionally, the target WLAN is hidden (where the target WLAN and WLAN are distinct). Preferably, the UE is simultaneously within range of the source WLAN and the target WLAN.

As used herein, “cryptographically derived” and/or “cryptographically processing” preferably connotes generated as a result of performing a (or the) cryptographic function, which may in turn include encrypting, decrypting, encoding, decoding, hashing and/or salting.

Preferably, the cryptographic function is performed by the WAP or by a server that is remote, and accessible, to the WAP. Preferably, a “network identifier” (e.g. the “source” and/or “target”) is a Service Set Identification (SSID). Preferably, the network device identifier is a Basic Service Set Identification (BSSID). Preferably, the step of assigning the access credentials is performed prior to a step of assigning the source network identifier and/or the network device identifier to the source WLAN and/or WAP.

Preferably, the step of generating the cryptographic output is performed so as to output a single text string. Optionally, the source WLAN and/or target WLAN is/are secured (private or encrypted), and therefore require(s) access credentials for the UE to connect to said WLAN/s.

According to another aspect of the invention, there is provided a method of operating a telecommunications network, the telecommunications network comprising: User Equipment (UE); a Wireless Access Point (WAP), identifiable by means of a network device identifier; a source Wireless Local Area Network (WLAN), provided by means of the WAP and identifiable by means of a source network identifier; and a target WLAN; and the method comprising the steps of: assigning to the target WLAN access credentials; performing a cryptographic function upon the assigned access credentials, thereby to generate a cryptographic output; and assigning, as the source network identifier and as the network device identifier, values derived from the cryptographic output; by means of the UE: identifying the source network identifier and the network device identifier cryptographically processing the identified source network identifier and the identified network device identifier so as to derive the access credentials; and requesting a connection to, or via, the target WLAN using access credentials derived by the UE.

Preferably, the target WLAN is identifiable by means of a target network identifier, and the method further comprises the step of providing to the UE the target network identifier by means of the source network identifier and/or the device network identifier. Alternatively, the UE may be pre-loaded with the target network identifier, and wherein the step of requesting a connection to the target WLAN may be performed by default in response to discovering the target network identifier.

Optionally, the UE is configured so as to be biased towards, compelled to, prioritise, and more preferably to most prioritise, attempt/attempting to connect to the target WLAN.

Preferably, the target network identifier is provided as part of the cryptographic output. Optionally, the target network identifier is provided in plaintext as part of the source network identifier and/or device network identifier.

Optionally, the target WLAN and the source WLAN are different. Optionally, the target WLAN is provided by a further WAP instead of by the WAP. Optionally, the target WLAN is provided by the WAP. Optionally, the target WLAN and the source WLAN are the same.

Preferably, the cryptographic function comprises a plurality of encryption functions, and wherein a separate one of said plurality of encryption functions is performed upon each of the source network identifier and the network device identifier. Alternatively, the same encryption function may be applied.

Preferably, the access credentials are used to permit the UE to connect to an external network accessible via the target WLAN. Preferably, the external network is a wide area network.

Optionally, the source WLAN and/or target WLAN is/are unsecured (public or unencrypted), and therefore may not require access credentials for the UE to connect to said WLAN/s, but access credentials may be required in order for the UE to connect via the WLAN/s to the external network. Optionally, the external network is only accessible to the UE by means of a captive portal. Optionally, the step of assigning, to the target WLAN, the access credentials means assigning the access credentials to the captive portal accessible by means of the target WLAN. Preferably, the access credentials are used to permit the UE to connect to a device accessible via the target WLAN.

Preferably, the source network identifier and/or the network device identifier is/are changed after establishing a connection between the UE and the target WLAN. Preferably, the source network device identifier and/or the network device identifier is/are changed upon termination of the connection. Alternatively, the source network device identifier and/or the network device identifier may be changed after each communication between the UE and the target WLAN, and preferably, the access credentials for the target WLAN change in response to a change in the source network identifier and/or the network device identifier.

According to yet another aspect of the invention, there is provided a method of operating User Equipment (UE) so as to access a telecommunications network, the telecommunications network comprising: a Wireless Access Point (WAP), identifiable by means of a network device identifier; a source Wireless Local Area Network (WLAN), provided by means of the WAP and identifiable by means of a source network identifier; and a target WLAN; and wherein a cryptographic output is generated by a cryptographic function upon both the source network identifier and the network device identifier and the target WLAN is assigned access credentials that comprise the cryptographic output; and the method comprising the steps of the UE: identifying the source network identifier and the network device identifier; cryptographically processing the identified source network identifier and the identified network device identifier so as to derive the cryptographic output; and requesting a connection to, or via, the target WLAN using access credentials derived by the UE from said cryptographic output.

According to still a further aspect of the invention, there is provided a method of operating a set of Wireless Access Points (WAPs), each of which is identifiable by means of a network device identifier, for providing a telecommunications network accessible by means of a User Equipment (UE), the method comprising the steps of: providing a source Wireless Local Area Network (WLAN), identifiable by means of a source network identifier; providing a target WLAN; generating a cryptographic output by performing a cryptographic function upon both the source network identifier and the network device identifier of each (or the) WAP in the set providing the source WLAN; assigning, to the target WLAN, access credentials, wherein said access credentials comprise the cryptographic output. Optionally, the set comprises only one WAP. Optionally, the method further comprises the step of permitting access to the target WLAN upon the UE requesting access using the access credentials.

According to a further aspect of the invention, there is provided a computer-readable carrier medium comprising a computer program, which, when the computer program is executed by a computer, causes the computer to carry out the steps as described above.

According to another aspect of the invention, there is provided a User Equipment (UE) configured to access a telecommunications network, said telecommunications network comprising: a Wireless Access Point (WAP), identifiable by means of a network device identifier; a source Wireless Local Area Network (WLAN), provided by means of the WAP and identifiable by means of a source network identifier; and a target WLAN; and wherein a cryptographic output is generated by a cryptographic function upon both the source network identifier and the network device identifier and the target WLAN is assigned access credentials that comprise the cryptographic output; and the UE comprising: a WLAN network interface for identifying the source network identifier and the network device identifier; a processor for cryptographically processing the identified source network identifier and the identified network device identifier so as to derive the cryptographic output and configured to cause the WLAN network interface to request a connection to, or via, the target WLAN using access credentials derived by the UE from said cryptographic output.

According to an additional aspect of the invention, there is provided a set of Wireless Access Points (WAPs) for providing a telecommunications network accessible by means of a User Equipment (UE), the set of WAPs comprising: a set of network device identifiers for identifying the WAPs in the set; a set of Wireless Local Area Network (WLAN) network interfaces for providing a source WLAN, identifiable by means of a source network identifier, and for providing a target WLAN; a processor configured to generate a cryptographic output by performing a cryptographic function upon both the source network identifier and the network device identifier of each (or the) WAP in the set providing the source WLAN and to assign, to the target WLAN, access credentials that comprise the cryptographic output. Optionally, the set comprises only one WAP.

According to a further aspect of the invention, there is provided a telecommunications system comprising: a User Equipment (UE) as described above; and a set of Wireless Access Points (WAPs) as described above.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

Figure 2:
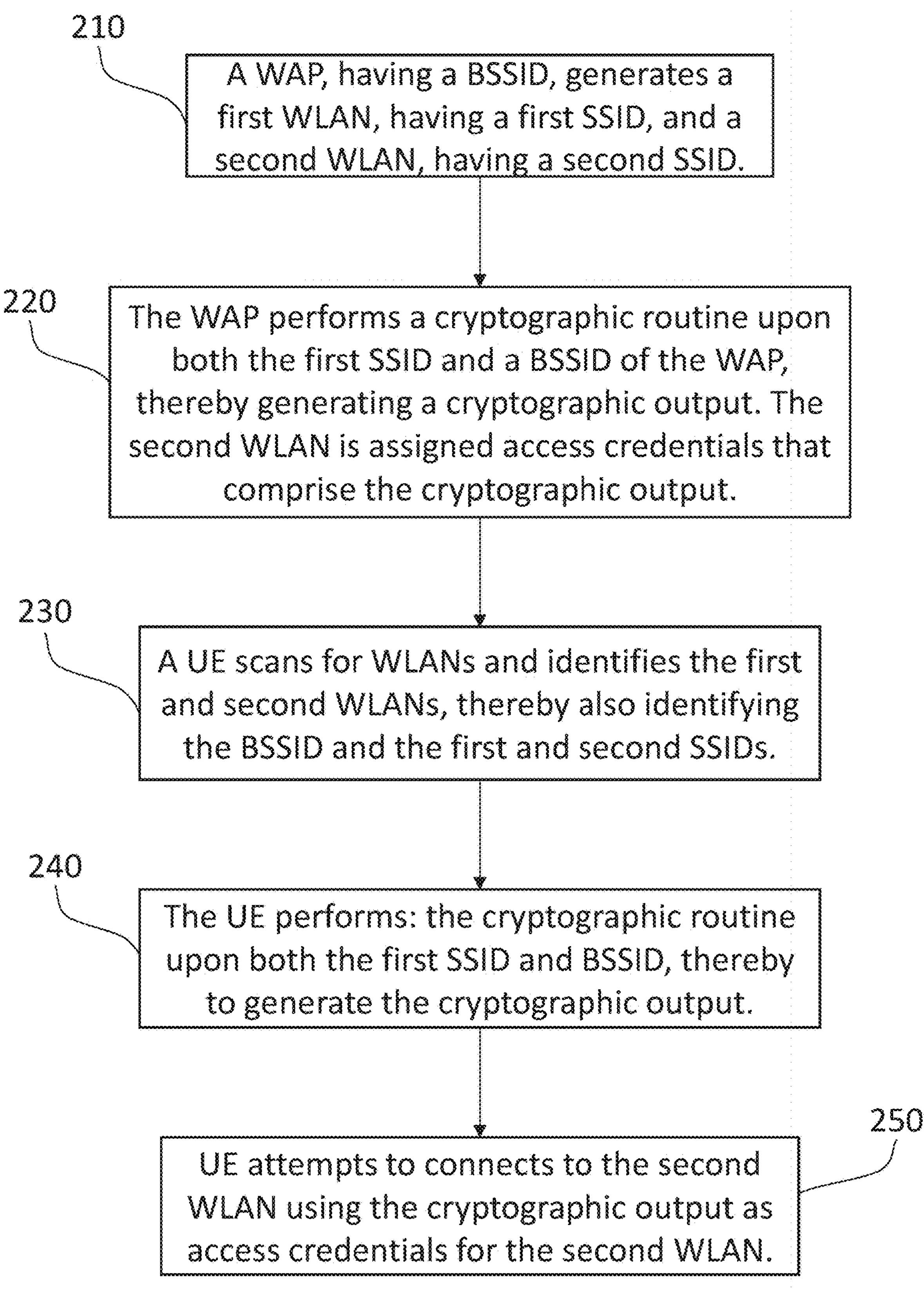

The invention extends to a method, User Equipment, a set of Wireless Access Points, and to a telecommunications system as described herein and/or substantially as illustrated with reference to the accompanying drawings. The present invention is now described, purely by way of example, with reference to the accompanying diagrammatic drawings, in which:

FIG. 1 is a schematic diagram of an exemplary telecommunications network; and FIG. 2 shows a process for operating the telecommunications network.

SPECIFIC DESCRIPTION

FIG. 1 shows an exemplary telecommunications network 100, which comprises: a wireless communications device or User Equipment (UE) 110; a Wireless Access Point (WAP) 120; and a wide area network 125.

In one example, the WAP is a wireless router, extender and/or repeater. The UE is available to be in the form of any electronic communications device incorporating a WLAN interface, and in particular a/an: personal computer (laptop or desktop); mobile telecommunications device; Internet of Things (IoT) device; wireless repeater; and/or wireless extender.

The WAP 120 is configured to generate Wireless Local Area Networks (WLANs) 130, to which the UE 110 is available to connect. In this example, the WLANs are available to use any one of the IEEE® 802.11 family of standards.

The WAP 120 is configured to provide a plurality of WLANs, and in the example of FIG. 1, the WAP provides two separate WLANs—a first WLAN 130-1 and a second WLAN 130-2.

The WAP 120 is connected (e.g. via an Ethernet connection) to the wide area network 125, for example in the form of a fixed-access broadband network. As a result, the UE 110 is available to connect, via a WLAN 130 provided by the WAP 120, to the wide area network 125, and in turn to, for example, the Internet.

The WAP 120 is configured to broadcast a network device identifier that identifies the WAP to the UE 110; this network device identifier is in the form of a Basic Service Set Identification (BSSID). By convention, the BSSID is, or is derived from, a data link layer network address of the WAP (and specifically of a Network Interface Controller (NIC) of the WAP), such as a Media Access Control (MAC) address. The WAP 120 is therefore identifiable to the UE 110 using the BSSID associated with the WAP 120.

The WAP 120 is also configured to broadcast a network identifier that identifies a specific WLAN to the UE 110; this network identifier is in the form of a Service Set IDentification (SSID), which is a configurable text-based identifier. By using different SSIDs for the first 130-1 and the second 130-2 WLANs, each WLAN is separately identifiable to the UE 110.

The UE 110 is located sufficiently proximate to the WAP 120 so as to be within wireless range of the WAP, and therefore capable of communicating with the WAP.

The WAP 120 and the UE 110 are configured for "zero-touch connection", in which, in this example, the processes of a UE identifying a WLAN, retrieving new access credentials for the WLAN, authenticating the UE onto the WLAN using the new access credentials, and then connecting to the WLAN may be performed by the UE without user intervention.

In order to facilitate zero-touch connection securely, the WAP 120 is provided with a cryptographic routine comprising an encryption function. Correspondingly, the UE 110 is provided with a counterpart cryptographic routine, comprising a decryption function, which is configured to decrypt ciphertext generated according to the encryption function. For example, the encryption function comprises a symmetric or asymmetric algorithm, and in particular according to the Advanced Encryption Standard (AES). The cryptographic routines also comprise instructions for directing when, how and upon what data to perform the encryption and decryption functions.

FIG. 2 shows an exemplary process 200 in which the telecommunications network 100 is configured so that the UE 110 requests a new WLAN connection using access credentials for that WLAN that have been secretly communicated to the UE.

At a first step 210, the WAP 120 generates the first 130-1 and the second 130-2 WLANs, which are identifiable to the UE by means of a first SSID and a second SSID respectively.

The first WLAN 130-1 is made publicly visible, as such the WAP broadcasts the first SSID, as well as the BSSID of the WAP 120.

At a next step, the second WLAN 130-2 is configured 220. According to the cryptographic routine, the encryption function is performed (in this example, by the WAP 120) upon both the first SSID and the BSSID of the WAP 120, thereby to generate a cryptographic output, which is then assigned to form a part of the access credentials for the second WLAN 130-2.

For example, the first SSID is in the form of the text string "ZTCSSIDONE" and the BSSID for the WAP 120 is in the form of the text string "ZTCBSSIDONE". The encryption function comprises a shift (or "Caesa") cipher configured to apply a single forward shift through the English alphabet to plaintext that is formed of the concatenation of the first SSID and the BSSID (i.e. "ZTCSSIDONEZTCBSSIDONE"), and the encryption function therefore generates the cryptographic output "GAJZZPKVULGAJIZZPKVUL"; this ciphertext is then used as the access credentials for the second WLAN 130-2.

In this way, the access credentials for the second WLAN are cryptographically-derivable from the broadcast identifiers associated with the first WLAN (which, in this role, is also referred to as the "source WLAN"), that is the first SSID and the BSSID of the WAP 120. Encoding of access credentials dually using SSIDs and BSSIDs may help improve the security of zero-touch connection systems, in particular since configuration (and therefore spoofing) of BSSIDs is more difficult than modifying SSIDs.

At a next step 230, the UE 110 initiates a search for available WLANs, for example by transmitting probes and/or listening for beacons. Accordingly, the UE detects the first WLAN 130-1 and the second WLAN 130-2. The UE therefore retrieves the first and second SSIDs and the BSSID of the WAP 120.

At a next step 240, in response to detecting the first SSID and the BSSID, the UE 110 performs the cryptographic routine, and specifically the decryption function, upon the first SSID and the BSSID, thereby to derive a cryptographic output.

In one example, the UE is pre-configured to perform the decryption function upon the first SSID and the BSSID, for example based on identifying a given format of SSID and/or BSSID.

At a next step 250, having generated the cryptographic output, the UE 110 is instructed to attempt a connection to the second WLAN 130-2 (as such, the second WLAN may also be referred to as the "target WLAN") using the cryptographic output, as derived by the UE at step 240, as the access credentials for the second WLAN 130-2. Accordingly, the UE is available to connect to the second WLAN 130-2.

In one example, the UE is pre-configured to attempt a connection to the second WLAN 130-2 by default.

It will be appreciated that the UE is only effectively able to derive the access credentials for the second WLAN, and therefore to connect to the second WLAN, because the UE and the WAP are applying corresponding (or mirror) encryption and decryption functions and because of the association between: the first SSID and the BSSID; and the access credentials for the second WLAN 130-2.

In one example, for improved security, after step 250 (and in particular after termination of a connection between the UE 110, or all UEs, and the second WLAN 130-2) the WAP is configured to generate a new first SSID and/or BSSID that is/are different to that used by the WAP in a (or any) preceding steps, including any previous iterations, of process 200. As a result, the access credentials for the second WLAN therefore also change. In particular, the BSSID is available to be changed as frequently as with every message between the UE and the WAP. For improved security, the UE is configured to prevent any attempted connection to the second WLAN based on the cryptographic output of previously-used first SSIDs and/or BSSIDs.

Alternatives and Modifications

In an alternative example, the first SSID is generated such that the target WLAN (e.g. second SSID) for the UE is derivable from the first SSID. In one example, the target WLAN is merely provided as part of the first SSID, without encryption. In an alternative example, the target WLAN is also (in addition to the access credentials) encoded into the first SSID and/or the BSSID, so that, upon the UE performing the cryptographic routine, the UE derives both (and distinguish between) the target WLAN and the access credentials for this target WLAN.

It will be appreciated that any form of encryption may be performed upon the first SSID and the BSSID, the first SSID and/or the BSSID having been processed in any manner. For example, in an alternative, the first SSID and/or the BSSID is/are first processed to generate a string for encryption (such as: concatenated; combined; intermeshed; reversed; converted into another representation, such as binary or hexadecimal; and/or truncated), and the generated string is then encrypted to generate the cryptographic output.

In an alternative, the first SSID and the BSSID are individually and independently encrypted, thereby generating two separated encrypted strings, which are then processed (for example, as described above) so as to then generate, as a single string, the cryptographic output. In this example, the encryption keys and/or methods of encryption used are available to differ as they are applied to the first SSID and the BSSID.

In the aforementioned, the WAP 120 encodes the access credentials for the second WLAN. In an alternative, the WAP instead or additionally encodes access credentials for the first WLAN within the first SSID and the BSSID. As such, the first WLAN is instead or additionally the target WLAN.

In an alternative, the first WLAN 130-1 and the second WLAN 130-2 are separately provided by two separate WAPs, in which each WAP is: accessible to the UE 110; connected to the wide area network 125; and in communication with the other.

In yet another example, the first 130-1 and/or the second 130-2 WLANs are public, as such no access credentials are required in order for the UE to establish a connection therewith. However, an onward connection from the UE to the wide area network 125 requires authentication of the UE 110; as such, the access credentials are instead used to access the wide area network 125, for example via a captive portal.

In still a further example, the access credentials are used to permit access to a device that is accessible via the target WLAN. For example, the device is a network storage device or a network media centre.

In one example, the access credentials for the first and/or second WLAN 130-2 are generated by a server, comprising the cryptographic routine and accessible via the wide area network 125, instead of at the WAP 120. Accordingly, the WAP(s) 120 is(/are) in communication with the server so as to receive the access credentials from the server (thereby to configure the target WLAN) and the first SSID and/or BSSID (thereby to configure the first WLAN 130-1). In one example, the server is in the form of a cloud-based management system for the WAP 120.

It will be appreciated that the methods described above may be applied to other forms of WLAN and/or Wireless Personal Area Networks, for example based on Bluetooth®, Zigbee®, and WiMAX™.

In an alternative example, the UE only performs the cryptographic routine (i.e. step 240) in response to identifying that the first SSID and/or the BSSID is in a pre-defined format. For example, where the pre-defined format means that the SSID and/or BSSID start and/or end/s with a pre-defined set of characters. Alternatively, the UE is configured to perform the cryptographic routine upon every detected SSID and BSSID.

In an alternative example, the UE only performs the cryptographic routine upon a portion of the first SSID and/or BSSID, in which said portion is identifiable to the UE by means of a pre-defined prefix and/or suffix.

In one example, the UE is available to be pre-configured so as to attempt connection to any WLAN from which the UE retrieves a SSID and BSSID.

In an alternative, steps 210 and 220 are available to be reversed to the extent that access credentials for the second WLAN 130-2 are first selected and then the first SSID and/or the BSSID of the WAP 120 are then created from the output of the cryptographic routine as applied to the access credentials, these created SSID and BSSID are then assigned to the first WLAN and/or WAP.

In an alternative, the first WLAN 130-1 is not configured to carry user traffic, and is available instead merely to communicate access credentials for the second WLAN 130-2.

In an alternative, the UE only attempts to connect to the first (or second) WLAN using decrypted access credentials once the UE has verified the authenticity of the WAP, and in particular as disclosed in UK patent application no. GB2104045.6, the contents of which are hereby incorporated by reference.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of operating a telecommunications network, the telecommunications network comprising: User Equipment, UE; a Wireless Access Point, WAP, identifiable by means of a network device identifier; a source Wireless Local Area Network, WLAN, provided by means of the WAP and identifiable by means of a source network identifier; and a target WLAN; and the method comprising the steps of:

generating a cryptographic output by performing a cryptographic function upon both the:
source network identifier; and
network device identifier;
assigning, to the target WLAN, access credentials, wherein said access credentials comprise the cryptographic output; and
by means of the UE:
identifying the source network identifier and the network device identifier;
cryptographically processing the identified source network identifier and the identified network device identifier so as to derive the cryptographic output; and
requesting a connection to, or via, the target WLAN using access credentials derived by the UE from said cryptographic output.

2. A method according to claim 1, wherein the target WLAN is identifiable by means of a target network identifier, and the method further comprises the step of providing to the UE the target network identifier by means of the source network identifier and/or the device network identifier.

3. A method according to claim 2, wherein the target network identifier is provided as part of the cryptographic output.

4. A method according to claim 1, wherein the target WLAN and the source WLAN are different.

5. A method according to claim 4, wherein the target WLAN is provided by a further WAP instead of by the WAP.

6. A method according to claim 1, wherein the target WLAN is provided by the WAP.

7. A method according to claim 6, wherein the target WLAN and the source WLAN are the same.

8. A method according to claim 1, wherein the cryptographic function comprises a plurality of encryption functions, and wherein a separate one of said plurality of encryption functions is performed upon each of the source network identifier and the network device identifier.

9. A method according to claim 1, wherein the access credentials are used to permit the UE to connect to an external network accessible via the target WLAN.

10. A method according to claim 1, wherein the access credentials are used to permit the UE to connect to a device accessible via the target WLAN.

11. A method according to claim 1, wherein the source network identifier and/or the network device identifier is/are changed after establishing a connection between the UE and the target WLAN.

12. A non-transitory computer-readable storage medium computer-readable carrier medium comprising a computer program, which, when the computer program is executed by a computer, causes the computer to carry out the steps of claim 1.

13. The method according to claim 1, wherein:
the source network identifier includes a Service Set Identification (SSID); and
network device identifier includes a Basic Service Set Identification (BSSID).

14. A method of operating User Equipment (UE) so as to access a telecommunications network, the telecommunications network comprising: a Wireless Access Point (WAP), identifiable by means of a network device identifier; a source Wireless Local Area Network (WLAN), provided by means of the WAP and identifiable by means of a source network identifier; and a target WLAN; and wherein a cryptographic output is generated by a cryptographic function upon both the source network identifier and the network device identifier and the target WLAN is assigned access credentials that comprise the cryptographic output; and the method comprising the steps of the UE:
identifying the source network identifier and the network device identifier;
cryptographically processing the identified source network identifier and the identified network device identifier so as to derive the cryptographic output; and
requesting a connection to, or via, the target WLAN using access credentials derived by the UE from said cryptographic output.

15. The method according to claim 14, wherein:

the source network identifier includes a Service Set Identification (SSID); and network device identifier includes a Basic Service Set Identification (BSSID).

16. A method of operating a set of Wireless Access Points (WAPs), each of which is identifiable by means of a network device identifier, for providing a telecommunications network accessible by means of a User Equipment (UE), the method comprising the steps of:

providing a source Wireless Local Area Network (WLAN), identifiable by means of a source network identifier;

providing a target WLAN;

generating a cryptographic output by performing a cryptographic function upon both the source network identifier and the network device identifier of each WAP in the set providing the source WLAN;

assigning, to the target WLAN, access credentials, wherein said access credentials comprise the cryptographic output.

17. The method according to claim 16, wherein:

the source network identifier includes a Service Set Identification (SSID); and network device identifier includes a Basic Service Set Identification (BSSID).

18. A User Equipment (UE) configured to access a telecommunications network, said telecommunications network comprising: a Wireless Access Point (WAP), identifiable by means of a network device identifier; a source Wireless Local Area Network (WLAN), provided by means of the WAP and identifiable by means of a source network identifier; and a target WLAN; and wherein a cryptographic output is generated by a cryptographic function upon both the source network identifier and the network device identifier and the target WLAN is assigned access credentials that comprise the cryptographic output; and the UE comprising:

a WLAN network interface for identifying the source network identifier and the network device identifier;

a processor for cryptographically processing the identified source network identifier and the identified network device identifier so as to derive the cryptographic output and configured to cause the WLAN network interface to request a connection to, or via, the target WLAN using access credentials derived by the UE from said cryptographic output.

19. A telecommunications system comprising:

a User Equipment (UE) according to claim 18; and a set of Wireless Access Points (WAPs).

20. The user equipment (UE) according to claim 18, wherein:

the source network identifier includes a Service Set Identification (SSID); and network device identifier includes a Basic Service Set Identification (BSSID).

21. A set of Wireless Access Points (WAPs) for providing a telecommunications network accessible by means of a User Equipment (UE), the set of WAPs comprising:

a set of Wireless Local Area Network (WLAN) network interfaces for providing: a source WLAN, identifiable by means of a source network identifier; a target WLAN; and a set of network device identifiers for identifying the WAPs in the set; and a processor configured to generate a cryptographic output by performing a cryptographic function upon both the source network identifier and the network device identifier of each WAP in the set providing the source WLAN and to assign, to the target WLAN, access credentials that comprise the cryptographic output.

22. The set of Wireless Access Points (WAPs) according to claim 21, wherein:

the source network identifier includes a Service Set Identification (SSID); and network device identifier includes a Basic Service Set Identification (BSSID).

* * * * *